Oct. 16, 1956  M. L. BECK  2,766,543
FISHING DEVICE
Filed May 26, 1954
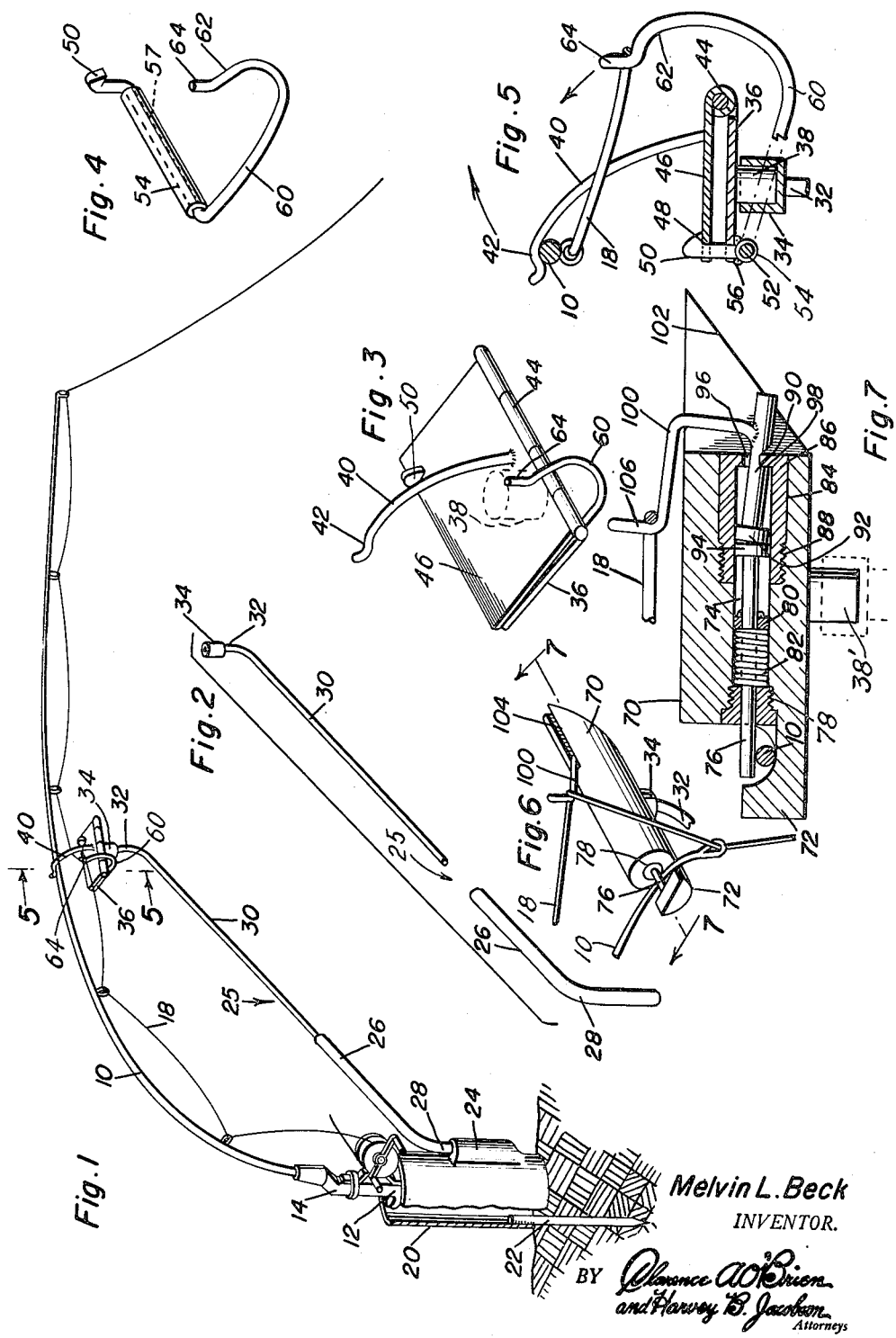
Melvin L. Beck
INVENTOR.
BY Clarence A. O'Brien
and Harvey B. Jacobson
Attorneys United States Patent Office 2,766,543
Patented Oct. 16, 1956

2,766,543

FISHING DEVICE

Melvin L. Beck, Darrouzett, Tex.

Application May 26, 1954, Serial No. 432,359

6 Claims. (Cl. 43—16)

This invention relates to a fishing device and particularly to a device for retaining a fishing rod of normal construction, in a tension position to automatically set a hook when a fish bites.

In fishing with a hook and line it frequently happens that while the fisherman is doing other things a fish may bite on his line but may be lost because the fisherman is not immediately at hand to make the necessary jerk on the line to set the hook.

The present invention relates to a device for automatically applying a jerk to a line in response to a fish biting thereon to set the hook and thereby secure the fish so that the fisherman may come and remove the fish from the line.

In the construction according to the present invention the device comprises an elongated tubular socket-like member adapted to receive the butt or handle of the fishing pole and an elongated arm mounted in angular relation on the socket and adapted to receive the pole intermediate the ends thereof while the pole is in a tensioned or flexed state and having a finger holding the pole in such a position and a trigger means responsive to a jerk on the line to release the finger and allow the pole to return to its straight or normal position thereby supplying sufficient jerk on the line to set the hook and by the change in position of the pole indicating to the fisherman that he has had a bite thereon and that the line should be attended to.

Accordingly, an object of the invention is to provide an improved fishing device characterized by novel structural means for automatically setting the fish hook when a fish bites.

A further object of the invention is to provide a device for holding a fish pole in tension position.

Other objects and many of the attendant advantages of the present invention will be apparent from the following detailed description taken in conjunction with the accompanying drawings in which:

Figure 1 is a perspective view of the device with a fish pole and line in operative position therein;

Figure 2 is a perspective view of the adjustable arm for holding the rod retaining finger in spaced relation from the rod holder;

Figure 3 is a perspective view of the releasable finger and the trigger control therefor;

Figure 4 is a perspective view of the rotating latch and the attached trigger;

Figure 5 is an enlarged cross-sectional view through the rod holding finger and the trigger control therefor taken substantially on the plane indicated by the section line 5—5 of Figure 1;

Figure 6 is a perspective view of a modified finger and trigger according to the invention; and Figure 7 is an enlarged longitudinal sectional view taken substantially on the plane indicated by the section line 7—7 of Figure 6 and showing the construction and arrangements of the parts of the modification.

In the exemplary embodiment according to the invention a fishing rod 10 is provided with a butt or handle portion 12 and has a seat 14 for receiving a reel 16 on which a line 18 may be mounted. The rod and reel are of well known construction.

The device per se includes a substantially tubular holder or socket member 20 adapted to receive the handle 12 of a fish pole and which is preferably lined with suitable resilient material (not shown) so that no damage will be done to the handle or butt of a pole. An anchoring pin or equivalent stake 22 is rigidly attached to and depends from the socket 20 and is adapted to extend into the earth but in the event the device is to be used in a boat or other support the pin 22 will be replaced by a suitable clamp preferably of a C-clamp variety (not shown).

A longitudinally extending sleeve 24 is rigidly mounted on the exterior of the socket 20 and preferably extends longitudinally in parallel relation to the axis of said socket 20. An arm indicated generally at 25 is provided with a base portion 26 having an angulated end 28 for insertion into the sleeve 24. Preferably the portion 26 is tubular to receive an extension member 30 which is provided with an angulated end 32 on which is fixedly mounted an adapter socket 34.

A trigger plate 36 is mounted on the adapter socket 34 by means of a pin 38 (Fig. 5) which may be threadedly or otherwise engaged therewith. A hold-down finger 40 is provided with a hooked end 42 and is mounted on the plate 36 by means of a hinge 44. The finger 40 is joined to the hinge 44 by means of a plate member 46 having a keeper notch 48 in the outer edge thereof for engagement by a latch 50. The latch 50 is provided with an angulated rocker shaft 52 which is mounted for rotation in a tubular bearing sleeve 54 which is fixed to the plate 36 by any suitable means such as the welding 56. A trigger 60 is formed integral with the shaft 52 of the latch 50 and is provided with a curved end 62 which extends over and above the hinge 44 and is provided with a line engaging detent 64.

In the operation of this embodiment of the invention the bait will be cast in the normal manner and the base or handle of the pole will be placed into the holder or socket 20 and the flexibly resilient rod 10 will be flexed to produce a tension thereon and the rod will be retained in its flexed position by the hold-down finger 40 which will be held in position by the latch 50, it being understood that the weight of the trigger portion 60 together with the curved portions 62 and 64 provides a bias to rotate the latch 50 about the sleeve 54 so that the latch is normally in latching position. The fish line 18 will be passed under the finger 40 together with the rod and hooked over the detent 64 of the trigger 60 so that when a tension is applied to the line it will be applied to the trigger 60 to rotate the shaft 52 and disengage the latch 50 from the plate 46 so that the tension of the rod will cause rotation of the finger 40 about the hinge 44 and the tension of the rod will cause the rod to straighten with a snap to apply a setting force to the fish hook (not shown) so that the fish will be properly hooked and may be later removed at will. It is to be noted that during the operation of the device the curved member 62 of the trigger 60 extends around the hinge 44 so that as the plate 46 is violently thrown backwards around the hinge 44 by the tension of the rod 10 it will violently engage the end 64 so that the resiliency of the trigger 60 will cause the plate 46 to fly back to normal position and because of the bias toward setting position supplied by the weight of the trigger the plate will be engaged by the latch 50 so that it will again be in engaged position for again engaging the fish rod 10 thereunder.

In the modification according to Figure 6, a trigger member 70 is provided with a substantially longitudinally extending member having a lip 72 at one end thereof and having a bore 74 therein. A rod engaging hold-down finger 76 is slidably mounted in the bore 74 and retained by means of a threaded plug 78. The finger 76 is provided with a stop member 80 and a compression spring 82 is mounted between the stop member 80 and the threaded plug 78 so that the spring 82 constantly urges the finger 76 to a retracted pole or rod releasing position.

The bore 74 is provided with a counterbored portion 84 in which is mounted a latch retaining member 86 preferably by means of a threaded connection 88. The latch member 90 is provided with a head 92 for engagement with a head 94 on the finger 76 and extends through an aperture 96 in the member 86. The latch 90 is provided with a notched portion 98 for engagement with the aperture 96 to retain the latch in a normally latched position.

A trigger 100 is rigidly attached to the latch 90 and extends upwardly and over the member. The end of the body 70 is provided with an oblique point 102 having a longitudinal slot 104 therein for guiding the trigger 100.

In the operation of the modification according to Figures 6 and 7, the trigger device 70 is mounted on the arm 25 in exactly the same manner as the trigger plate 36 and the rod is flexed into engagement with the external lip 72 and the trigger member 100 or the latch 90 is actuated by the fingers of the operator to depress the spring 82 and extend the finger 76 into rod-engaging position. The line will then be connected over the end or detent 106 of the trigger 100 so that when the fish tugs at the line 18 the latch 90 will be disengaged from the aperture 96 and the spring 82 will retract the finger 76 so that the tension of the rod 10 will supply a snap thereto to cause the line 18 to set the fish hook as in the prior modification.

While for purposes of exemplification a particular embodiment of the invention has been shown and described according to the present understanding thereof, it will be apparent to those skilled in the art that various changes and modifications may be made in the construction and arrangement of parts thereof without departing from the true spirit and scope of the invention.

What is claimed as new is as follows:

1. A fish rod tender comprising a substantially tubular rod holder, a supporting pin fixed on said holder, a sleeve fixed on said rod holder and extending substantially parallel thereto, an angulated arm mounted in said sleeve, a plate mounted on the arm remote from said holder, a finger, means hingedly mounting said finger on said plate, a latch hingedly mounted on said plate arranged and adapted to releasably engage said means, a trigger fixedly connected to said latch, said trigger extending under said plate and into close cooperating proximity with said finger.

2. In a fish rod holder, a rod release comprising a plate, a rod hold-down finger hingedly mounted on said plate, a latch operatively and releasably cooperable with said finger and serving to maintain the finger in a set but releasable position relative to said rod and plate, a trigger operatively connected with said latch, said trigger extending under said plate and having a free end portion curved into proximity with said finger.

3. A mechanical fishing rod tender comprising a rod holding socket member adapted to receive the handle-equipped end of a fishing rod, means carried by said socket member for securing the same to a relatively stationary support, a complemental arm having one end portion secured to said socket member and its other end portion free and reaching to a point well beyond the established position of said socket member, a fishing rod hold-down finger operatively mounted on the free end portion of said arm and assuming a position remote from said socket member, latch means cooperable with and serving to retain said hold-down finger in a predetermined set position during which said rod is flexed and thus held down under responsive tension, a trigger operatively connected with said latch means, said trigger having a laterally directed free end portion located in a closely spaced operative relation in respect to said hold-down finger and constituting a detent which is adapted to permit a portion of a baited fishing line to be operatively and releasably connected thereto for actuation of the same.

4. A mechanical fishing rod tender comprising means adapted to be securely mounted on a relatively stationary support and designed to accommodatingly receive and hold the handle-equipped end of a flexible fishing rod in a temporarily anchored position, an elongate reach arm having one end portion attached to said means, the opposite end portion of said reach arm being free and adapted to be disposed in close proximity in respect to a selected flexible portion of the stated fishing rod, a trigger mounting member mounted on the free end portion of said reach arm, a hold-down finger carried by said member and releasably engageable with a selected flexible portion of the rod in a manner to place the rod under tension, a trigger rod operatively mounted on said mounting member and having a laterally bent free end portion providing a detent for accommodatingly and releasably holding a baited fishing line in a manner to release said hold-down finger from the fishing rod under predetermined conditions, the free end portion of said reach arm having a socket member thereon, and said trigger mounting member embodying an integral part connected with said socket member.

5. The structure defined in claim 4 and wherein said member is provided with a lip for retentive cooperation with the coacting portion of the fishing rod, said member having an axial bore cooperating with said lip and said hold-down finger being spring-pressed and slidably mounted in said bore.

6. A mechanical fishing rod tender comprising a socket member, means whereby said socket member may be fastened to a relatively stationary support, said socket member being adapted to permit the handle portion of a conventional-type fishing rod to be removably inserted and anchored therein so that the flexible rod proper, extending beyond said socket member, may be manually flexed and placed under tension, a complemental extensible and retractible arm having one end attached to and supported from said socket member and having its other end free and reaching to a predetermined point for cooperation with an intermediate portion of said flexible rod, a fishing rod hold-down finger, means located at the free end of said arm and on which said hold-down finger is supported for operation, and pivotally mounted latch means cooperable with and serving to retain said hold-down finger in a predetermined set position when said rod is flexed by hand, tensioned and thus held down under inherently responsive ready-to-operate tension, said latch means having a terminal portion with which a cooperating portion of the usual fishing line is releasably engageable to actuate the latch means.

References Cited in the file of this patent

UNITED STATES PATENTS

| | | |
|---|---|---|
| 1,021,147 | Green | Mar. 26, 1912 |
| 1,719,695 | Ferguson | July 2, 1929 |
| 2,548,351 | Coombs | Apr. 10, 1951 |
| 2,615,273 | Meller | Oct. 28, 1952 |